US008914502B2

(12) United States Patent
Srinivasan et al.

(10) Patent No.: US 8,914,502 B2
(45) Date of Patent: Dec. 16, 2014

(54) SYSTEM AND METHOD FOR DYNAMIC DISCOVERY OF ORIGIN SERVERS IN A TRAFFIC DIRECTOR ENVIRONMENT

(75) Inventors: Arvind Srinivasan, Bangalore (IN); Sriram Natarajan, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 12 days.

(21) Appl. No.: 13/601,530

(22) Filed: Aug. 31, 2012

(65) Prior Publication Data
US 2013/0080628 A1 Mar. 28, 2013

Related U.S. Application Data

(60) Provisional application No. 61/539,886, filed on Sep. 27, 2011, provisional application No. 61/539,900, filed on Sep. 27, 2011.

(51) Int. Cl.

| | |
|---|---|
| G06F 15/16 | (2006.01) |
| G06F 15/167 | (2006.01) |
| G06F 15/177 | (2006.01) |
| G06F 11/00 | (2006.01) |
| H04L 1/00 | (2006.01) |
| G06F 9/50 | (2006.01) |
| G06F 9/44 | (2006.01) |
| G06F 9/455 | (2006.01) |
| G06F 11/20 | (2006.01) |
| H04L 29/08 | (2006.01) |

(52) U.S. Cl.
CPC .............. *G06F 9/505* (2013.01); *G06F 9/4443* (2013.01); *G06F 9/45512* (2013.01); *G06F 11/2041* (2013.01); *H04L 67/1008* (2013.01)
USPC .......... 709/224; 709/219; 709/226; 709/235; 709/217; 370/216; 370/230; 370/252

(58) Field of Classification Search
CPC .................... H04L 29/08072; H04L 41/0213; H04L 45/00
See application file for complete search history.

(56) References Cited

U.S. PATENT DOCUMENTS

| | | | |
|---|---|---|---|
| 6,691,244 B1 | 2/2004 | Kampe et al. | |
| 7,158,926 B2 | 1/2007 | Kampe | |

(Continued)

FOREIGN PATENT DOCUMENTS

| | | |
|---|---|---|
| GB | 2 360 369 A | 9/2001 |
| WO | 02/07037 | 1/2002 |

(Continued)

OTHER PUBLICATIONS

Oracle, Oracle Traffic Director, Aug. 2013, E21036-04.*

(Continued)

*Primary Examiner* — Ario Etienne
*Assistant Examiner* — Ho Shiu
(74) *Attorney, Agent, or Firm* — Meyer IP Law Group

(57) ABSTRACT

Described herein are systems and methods for use with a load balancer or traffic director, and administration thereof, wherein the traffic director is provided as a software-based load balancer that can be used to deliver a fast, reliable, scalable, and secure platform for load-balancing Internet and other traffic to back-end origin servers, such as web servers, application servers, or other resource servers. In accordance with an embodiment, the system comprises a traffic director having one or more traffic director instances, which is configured to receive and communicate requests, from clients, to origin servers having one or more pools of servers. A health check subsystem periodically checks the health of its configured resource servers, and also attempts to detect changes in the one or more pools, by sending requests to any new server instances configured as origin servers within the pool, receiving appropriate responses, and updating the configuration accordingly.

20 Claims, 8 Drawing Sheets

(56) References Cited

U.S. PATENT DOCUMENTS

| | | |
|---|---|---|
| 7,289,445 B2 | 10/2007 | Illikkal et al. |
| 7,321,926 B1 | 1/2008 | Zhang et al. |
| 7,370,083 B2 | 5/2008 | Husain et al. |
| 7,395,355 B2 | 7/2008 | Afergan et al. |
| 7,616,625 B1 | 11/2009 | Un et al. |
| 7,619,545 B2 | 11/2009 | Samuels et al. |
| 7,664,948 B2 | 2/2010 | Moreau |
| 7,849,368 B2 * | 12/2010 | Srivastava et al. ........... 714/47.1 |
| 2001/0049732 A1 | 12/2001 | Raciborski et al. |
| 2002/0087694 A1 | 7/2002 | Daoud |
| 2002/0122388 A1 | 9/2002 | Behbehani |
| 2002/0152307 A1 | 10/2002 | Doyle et al. |
| 2003/0051055 A1 | 3/2003 | Parrella et al. |
| 2003/0195940 A1 | 10/2003 | Basu et al. |
| 2004/0031030 A1 | 2/2004 | Kidder et al. |
| 2004/0049598 A1 | 3/2004 | Tucker et al. |
| 2004/0107273 A1 | 6/2004 | Biran et al. |
| 2004/0172470 A1 * | 9/2004 | Shiina ............................. 709/224 |
| 2005/0086337 A1 * | 4/2005 | Quittek et al. ................ 709/223 |
| 2005/0188295 A1 | 8/2005 | Konkus et al. |
| 2005/0198247 A1 | 9/2005 | Perry et al. |
| 2005/0262183 A1 | 11/2005 | Colrain et al. |
| 2006/0062177 A1 | 3/2006 | Asthana et al. |
| 2006/0085680 A1 * | 4/2006 | Matsuno et al. ................ 714/17 |
| 2006/0190579 A1 | 8/2006 | Rachniowski et al. |
| 2007/0005801 A1 | 1/2007 | Kumar et al. |
| 2007/0169049 A1 | 7/2007 | Gingell et al. |
| 2007/0174660 A1 | 7/2007 | Peddada |
| 2007/0226359 A1 | 9/2007 | Gunduc et al. |
| 2007/0260702 A1 * | 11/2007 | Richardson et al. .......... 709/217 |
| 2008/0046596 A1 | 2/2008 | Afergan et al. |
| 2008/0133536 A1 | 6/2008 | Bjorner et al. |
| 2008/0228939 A1 | 9/2008 | Samuels et al. |
| 2009/0204885 A1 | 8/2009 | Ellsworth et al. |
| 2009/0245122 A1 * | 10/2009 | Maiocco et al. ............... 370/252 |
| 2009/0328054 A1 | 12/2009 | Paramasivam et al. |
| 2010/0070561 A1 | 3/2010 | Dhoolia et al. |
| 2010/0220740 A1 | 9/2010 | Hufferd |
| 2010/0235484 A1 | 9/2010 | Bolan et al. |
| 2011/0107136 A1 | 5/2011 | Jonnagadla et al. |
| 2011/0122893 A1 | 5/2011 | Kang et al. |
| 2011/0145786 A1 | 6/2011 | Fayed et al. |
| 2011/0161523 A1 | 6/2011 | Erickson et al. |
| 2011/0208808 A1 | 8/2011 | Corbett |
| 2012/0096166 A1 * | 4/2012 | Devarapalli et al. .......... 709/226 |
| 2012/0271964 A1 * | 10/2012 | Porter ............................ 709/235 |
| 2013/0054806 A1 | 2/2013 | Francis et al. |

FOREIGN PATENT DOCUMENTS

| | | |
|---|---|---|
| WO | 03/105004 | 12/2003 |
| WO | 2004/008334 | 1/2004 |

OTHER PUBLICATIONS

Brocade Communiations Systems, ServerIron ADX Health Checks, Jun. 2009.*

Wikipedia, HTTP Compression, pp. 1-2, http://en.wikipedia.org/w/index.php?title=HTTP_compression&oldid=450858133, Sep. 16, 2011.

Method and System for Displaying Graphical Objects in a Command Line Interface (CLI) Terminal, IP.Com Journal, IP.Com Inc., West Henrietta, NY, US, Feb. 18, 2010.

Elkstein, Dr. M., 14.3 How Do I Handle Authentication in REST?, Aug. 26, 2011, http://web.archive.org/web/20110826023142/http://rest.elkstein.org/2008/01/how-do-i-handle-authentication-in-rest.html, retrieved Apr. 24, 2013.

International Searching Authority, International Search Report and Written Opinion for PCT International Application No. PCT/US2012/057373, Feb. 14, 2013, 13 pages.

International Searching Authority, International Search Report and Written Opinion for PCT International Application No. PCT/US2012/057370, May 31, 2013, 17 pages.

International Searching Authority, International Search Report and Written Opinion for PCT International Application No. PCT/US2012/057375, May 24, 2013, 19 pages.

International Searching Authority, International Search Report and Written Opinion for PCT International Application No. PCT/US2012/057620, Jun. 5, 2013, 22 pages.

* cited by examiner

SYSTEM AND METHOD FOR DYNAMIC DISCOVERY OF ORIGIN SERVERS IN A TRAFFIC DIRECTOR ENVIRONMENT

CLAIM OF PRIORITY

This application claims the benefit of priority to U.S. Provisional Patent Application No. 61/539,886, titled "SYSTEMS AND METHODS FOR USE WITH AN APPLICATION SERVER TRAFFIC DIRECTOR (CORE FEATURES)", filed Sep. 27, 2011; and U.S. Provisional Patent Application No. 61/539,900, titled "SYSTEMS AND METHODS FOR USE WITH AN APPLICATION SERVER TRAFFIC DIRECTOR (ADMIN FEATURES)", filed Sep. 27, 2011; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to a load balancer or traffic director, for use in an application server, middleware machine or other computing environment, and is particularly related to a system and method for dynamic discovery of origin servers in a traffic director environment.

BACKGROUND

A typical enterprise-level computing environment can include many different types of computing resources (e.g., web servers, application servers, database servers, or other types of resource servers) which are intended to be accessed over a network (e.g., a company's internal Ethernet network, or the Internet) by other computers, or by users operating various different types of computing devices. A familiar example is the use of a client computer, such as a laptop equipped with a web browser application, by which a user can access a web server via the Internet.

Today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies. These are the types of environments that embodiments of the invention can be used with.

SUMMARY

Described herein are systems and methods for use with a load balancer or traffic director, and administration thereof. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

Embodiments of the traffic director are particularly useful in application server, middleware machine, and similar high-performance enterprise-level computing environments, such as Oracle WebLogic and Exalogic environments.

In accordance with an embodiment, the system comprises a traffic director having one or more traffic director instances, which is configured to receive and communicate requests, from clients, to origin servers having one or more pools of servers. A health check subsystem periodically checks the health of its configured resource servers, and also attempts to detect changes in the one or more pools, by sending requests to any new server instances configured as origin servers within the pool, receiving appropriate responses, and updating the configuration accordingly.

DETAILED DESCRIPTION

Figure 1:
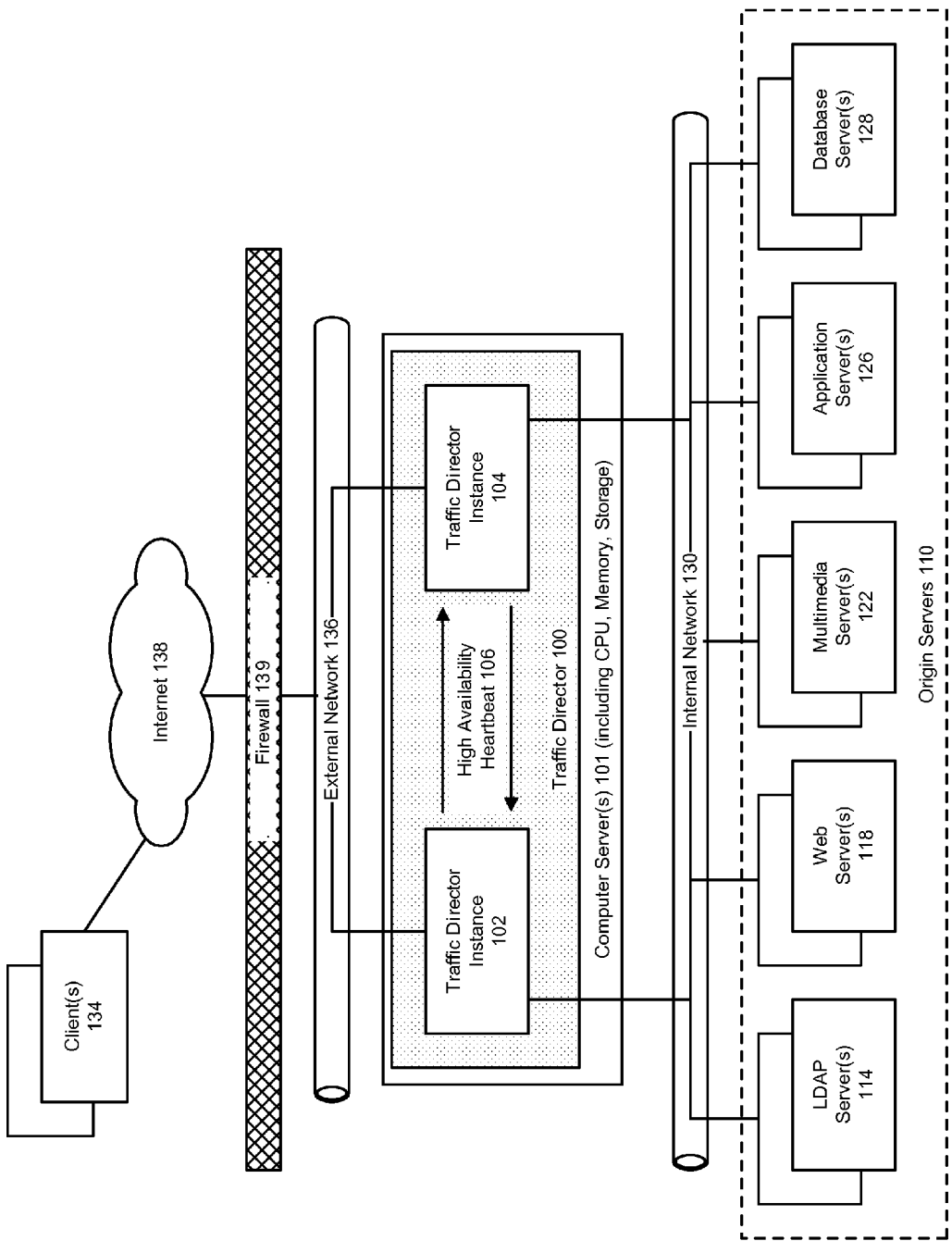
FIG. 1 illustrates a computing environment which includes a load balancer or traffic director, in accordance with an embodiment.

As described above, today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies.

Described herein are systems and methods for use with a load balancer or traffic director, and administration thereof. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

Embodiments of the traffic director are particularly useful in application server, middleware machine, and similar high-performance enterprise-level computing environments, such as Oracle WebLogic and Exalogic environments.

In accordance with an embodiment, the traffic director serves as an entry point for traffic such as hypertext transfer protocol (HTTP) and hypertext transfer protocol secure (HTTPS) requests, which are received from clients or client devices, for communication to a back-end of resources or resource servers acting as origin servers. Each traffic director includes one or more traffic director instances defined by a configuration, wherein the configuration provides information about various elements of that instance, such as listeners, origin servers, failover groups, and logs.

Examples of the types of clients that can be used with the system include computer servers, laptop computers, portable devices such as smartphones, and other types of computing devices, some of which may include, e.g., a web browser application for accessing a web server.

Examples of the types of resources that can be used as origin servers include lightweight directory access protocol (LDAP) servers, web servers, multimedia servers, application servers, database servers, and other types of resources.

In accordance with an embodiment, the traffic director can perform tasks such as distributing requests to origin servers based on one or more load-balancing methods; routing requests based on specified rules; caching frequently accessed data; prioritize traffic; and controlling the quality of service.

From a performance perspective, in accordance with an embodiment, the traffic director can include an architecture that enables it to handle large volumes of traffic with low latency. For example, embodiments can be optimized for use within a high-performance computing environment such as, e.g., Oracle Exalogic Elastic Cloud, or to communicate with origin servers at the back-end using a high performance communication fabric such as, e.g., InfiniBand. In accordance with an embodiment, to support high availability, the traffic director can recognize failover groups of traffic director instances that provide active-passive or active-active failover. As the volume of traffic to a network increases, the traffic director environment can be scaled by reconfiguring the traffic director with additional back-end servers to which it can route requests, or by modifying the rate at which traffic is communicated.

From an administration perspective, in accordance with an embodiment, the traffic director is designed to be easy to install, configure, and use; and can include a simple, wizard-driven graphical interface, as well as a robust command-line interface, for use by an administrator in managing traffic director instances. For any particular organization, depending on their business requirements, such as the number of back-end applications for which they want to use the traffic director to balance requests, their internal requirements such as security, and the traffic director features they wish to use, the traffic director topology can be varied to address their needs. For example, a simple traffic director topology might initially utilize a single traffic director instance running on a dedicated compute node and distributing client requests to a pool of servers at the back-end. To avoid a single point of failure, an administrator can configure two homogenous traffic director instances running on different nodes and forming an active-passive failover pair. To improve resource utilization, an administrator can configure the two traffic director instances in active-active mode with two virtual IP addresses.

GLOSSARY

In accordance with an embodiment, the following terms are used herein. It will be evident that, in accordance with other embodiments, additional and/or different terms can be used.

Configuration: A collection of configurable elements (e.g., metadata) that determines the run-time behavior of a traffic director instance. In accordance with an embodiment, a typical configuration contains definitions for listeners (e.g., IP address and port combinations) on which the traffic director should listen for requests, together with information about servers at the back-end to which the requests should be sent. The traffic director can read the configuration when a traffic director instance starts, and while processing client requests.

Instance (Traffic Director Instance): A traffic director server that is instantiated from a configuration and deployed on an administration node or the administration server.

Cluster: A collection of two or more traffic director instances that are created from the same configuration.

Failover Group: Two or more traffic director instances grouped by a virtual IP address (VIP). In accordance with an embodiment, a failover group provides high availability in active-passive mode; wherein requests are received at the VIP and routed to the instance that is designated as the primary instance; if the primary instance is not reachable, requests are routed to the backup instance. In accordance with an embodiment, for active-active failover, two failover groups are required, each with a unique VIP, but both comprising the same nodes with the primary and backup roles reversed; each instance in the failover group is designated as the primary instance for one VIP, and the backup for the other VIP.

Administration Server: A specially configured traffic director instance that hosts the interfaces, including administration console and command-line interface, through which an administrator can create traffic director configurations, deploy them as instances on administration nodes, and manage the instances.

Administration Node: A physical server that is designated as a host on which the administrator can deploy traffic director instances. In accordance with an embodiment, on a given node, the administrator can deploy only one instance of a configuration.

INSTANCE_HOME: A directory of the administrator's choice, on the administration server or an administration node, in which the configuration data and binary files pertaining to traffic director instances are stored.

ORACLE_HOME: A directory of the administrator's choice in which the administrator installs the traffic director binaries.

Administration Console: A web-based graphical interface on the administration server that the administrator can use to create, deploy, and manage traffic director instances.

Client: In accordance with an embodiment, an agent (e.g., a web browser or an application) that sends requests (e.g., HTTP and HTTPS requests) to traffic director instances. Examples of the types of clients that can be used with the system include computer servers, laptop computers, portable devices such as smartphones, and other types of computing devices, some of which may include, e.g., a web browser application for accessing a web server.

Origin Server: In accordance with an embodiment, a resource or server at the back-end, to which the traffic director forwards the requests that it receives from clients, and from which it receives responses to client requests. Examples of the types of resources that can be used as origin servers include lightweight directory access protocol (LDAP) servers, web servers, multimedia servers, application servers, database servers, and other types of resources.

Origin-server Pool: A collection of origin servers that host the same application or service, and that the administrator can load-balance by using the traffic director. In accordance with an embodiment, the traffic director distributes client requests to servers in the origin-server pool based on the load-distribution method(s) that are specified for that pool.

Virtual Server: A virtual entity within a traffic director server instance that provides a unique IP address (or host name) and port combination, through which the traffic director can serve requests for one or more domains. In accordance with an embodiment, a traffic director instance on a node can contain multiple virtual servers. The administrator can configure settings such as the maximum number of incoming connections specifically for each virtual server, and can also customize how each virtual server handles requests.

FIG. 1 illustrates a computing environment which includes a load balancer or traffic director, in accordance with an embodiment. As shown in FIG. 1, in accordance with an embodiment, the traffic director 100 (referred to herein in some embodiments as Oracle Traffic Director (OTD)) can be deployed on one or more physical computer servers 101 (or similar computing devices that include a processor (CPU), memory, and storage), and can include one or more traffic director instances 102, 104, which in turn can communicate with one another using a high-availability heartbeat or similar means 106.

For any particular organization, depending on their business requirements, such as the number of back-end applications for which they want to use the traffic director to balance requests, their internal requirements such as security, and the traffic director features they wish to use, the traffic director topology can be varied to address their needs. The back-end can include one or more origin servers 110, examples of which can include LDAP servers 114, web servers 118, multimedia servers 122, application servers 126, and database servers 128. In accordance with an embodiment, the application server can be a WebLogic server (WLS). Other types of origin servers, and application servers, can be used, depending on the particular needs of the organization. Each of the origin servers can communicate with one another, and with the traffic director, via an internal network 130 such as an Ethernet network.

In accordance with an embodiment, the traffic director can receive requests from clients 134, via an external network 136, the Internet 138, and in the case of many organizations a firewall 139. Examples of the types of clients that can be used with the system include computer servers, laptop computers, portable devices such as smartphones, and other types of computing devices, some of which may include, e.g., a web browser application for accessing a web server.

Figure 2:
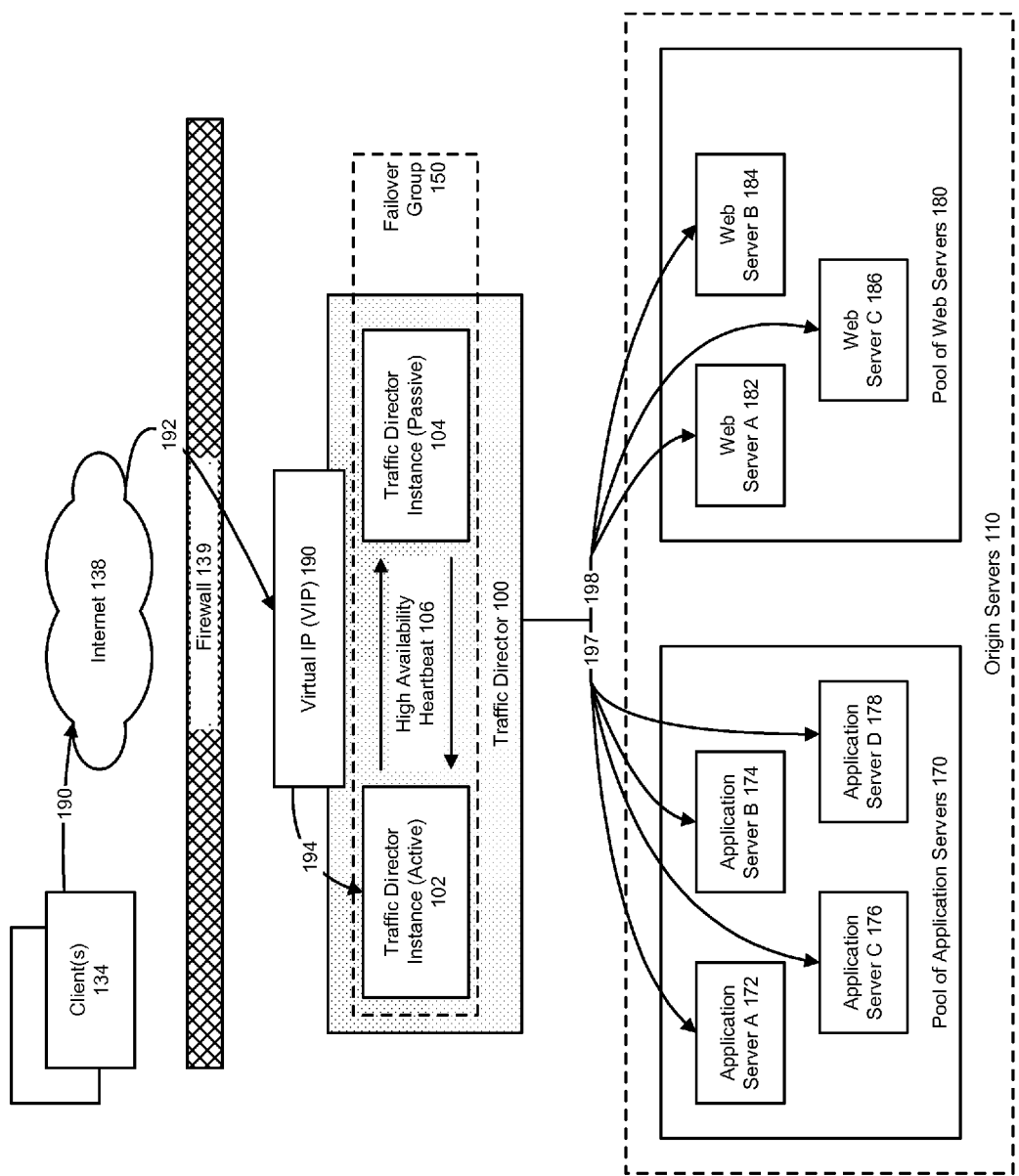
FIG. 2 illustrates the use of a traffic director with one or more pools or origin servers, in accordance with an embodiment.

FIG. 2 illustrates the use of a traffic director with one or more pools or origin servers, in accordance with an embodiment. In the example illustrated in FIG. 2, the traffic director is used with two pools, including a (first) pool of application servers 170, having four application servers, here indicated as A 172, B 174, C 176, D 178; and a (second) pool of web servers 180, having three web servers, here indicated as A 182, B 184, C1 86. In accordance with other embodiments and examples, other types and numbers of pools and servers can be used, depending on the particular needs of the organization.

In the example illustrated in FIG. 2, the topology comprises two traffic director instances (102 and 104) forming an active-passive failover group 150, and including a single virtual IP address 190 for receipt of client requests. When the active instance (in this example instance 102) receives a request 190, 192, 194, it determines the server pool to which the request should be sent, and forwards the request 197, 198 to one of the servers in that pool, based on the load-distribution method(s) that are specified for that pool.

Although the example shown in FIG. 2 illustrates the use of two server pools at the back-end, an administrator can configure the traffic director to route requests to servers in multiple pools. In the active-passive setup illustrated in FIG. 2, one node in the failover group is redundant at any point in time. In accordance with an embodiment, to improve resource utilization, the administrator can configure the two traffic director instances in active-active mode with two virtual IP addresses; in this scenario each instance caters to requests received on one virtual IP address, and backs up the other instance.

Figure 3:
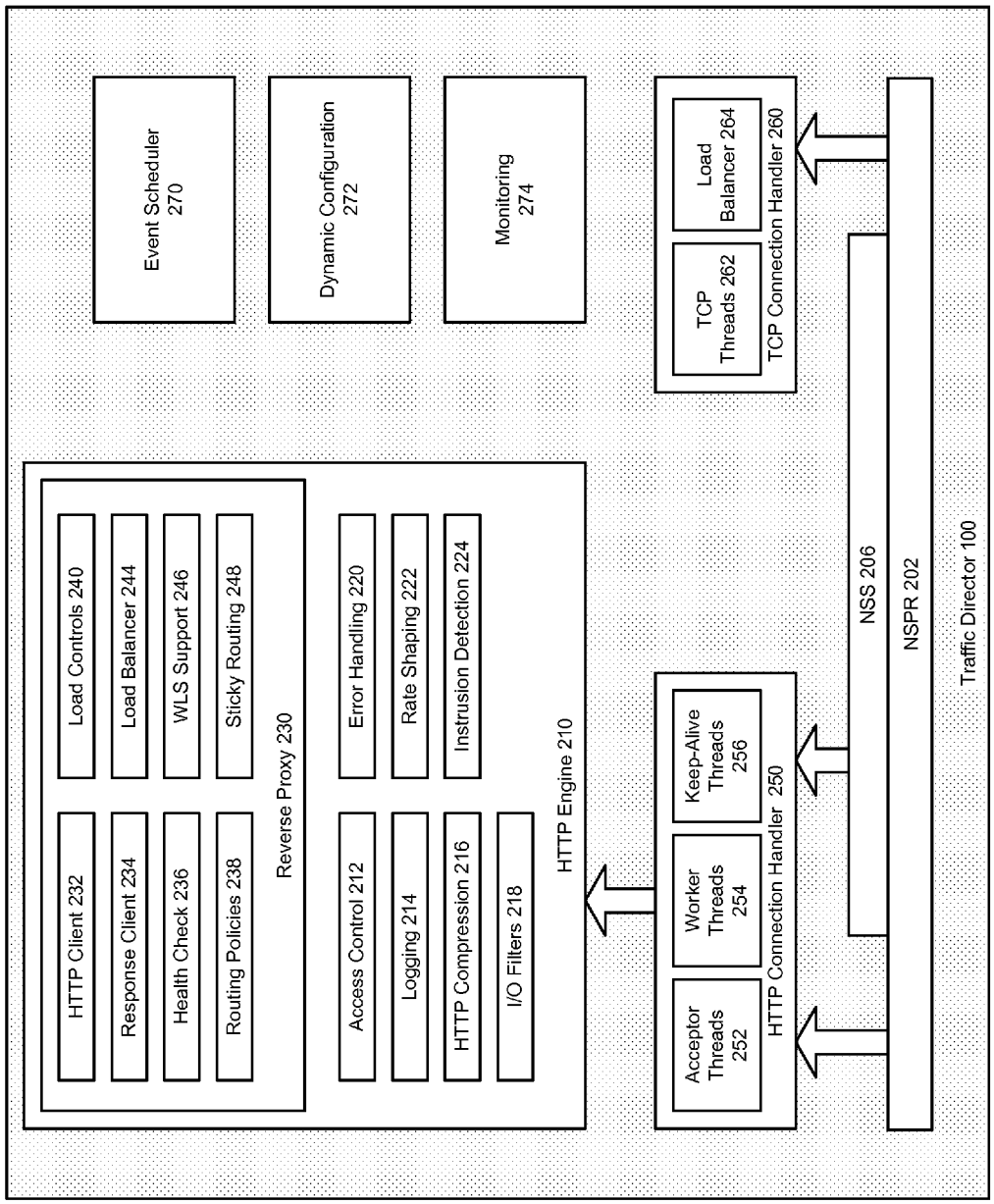
FIG. 3 illustrates a traffic director architecture, in accordance with an embodiment.

FIG. 3 illustrates a traffic director architecture, in accordance with an embodiment. In accordance with an embodiment, the traffic director can include an architecture that enables it to handle large volumes of traffic with low latency. Embodiments can also be optimized for use within a high-performance computing environment, or to communicate with origin servers at the back-end using a high performance communication fabric.

As shown in FIG. 3, in accordance with an embodiment, the traffic director can include one or more Netscape portable runtime (NSPR) 202 and Network Security Services (NSS) 206 layers. In accordance with an embodiment, the traffic director can also include an HTTP engine 210 having one or more access control 212, logging 214, HTTP compression 216, I/O filter 218, error handling 220, rate shaping 222, intrusion detection 224, or other components; and a reverse proxy component 230 having one or more http client 232, response client 234, health check 236, routing policies 238, load controls 240, load balancer 244, WLS support 246, sticky routing 248, or other components. In accordance with an embodiment, the traffic director can also include an HTTP connection handler 250 having one or more acceptor threads 252, worker threads 254, keep-alive threads 256, or other components. In accordance with an embodiment, the traffic director can also include a TCP connection handler 260 having one or more TCP threads 262, load balancer 264, or other components. In accordance with an embodiment, the traffic director can also include one or more evens schedule 270, dynamic configuration 272, monitoring 274, or other components.

It will be evident that, in accordance with other embodiments, additional and/or different components can be used.

Figure 4:
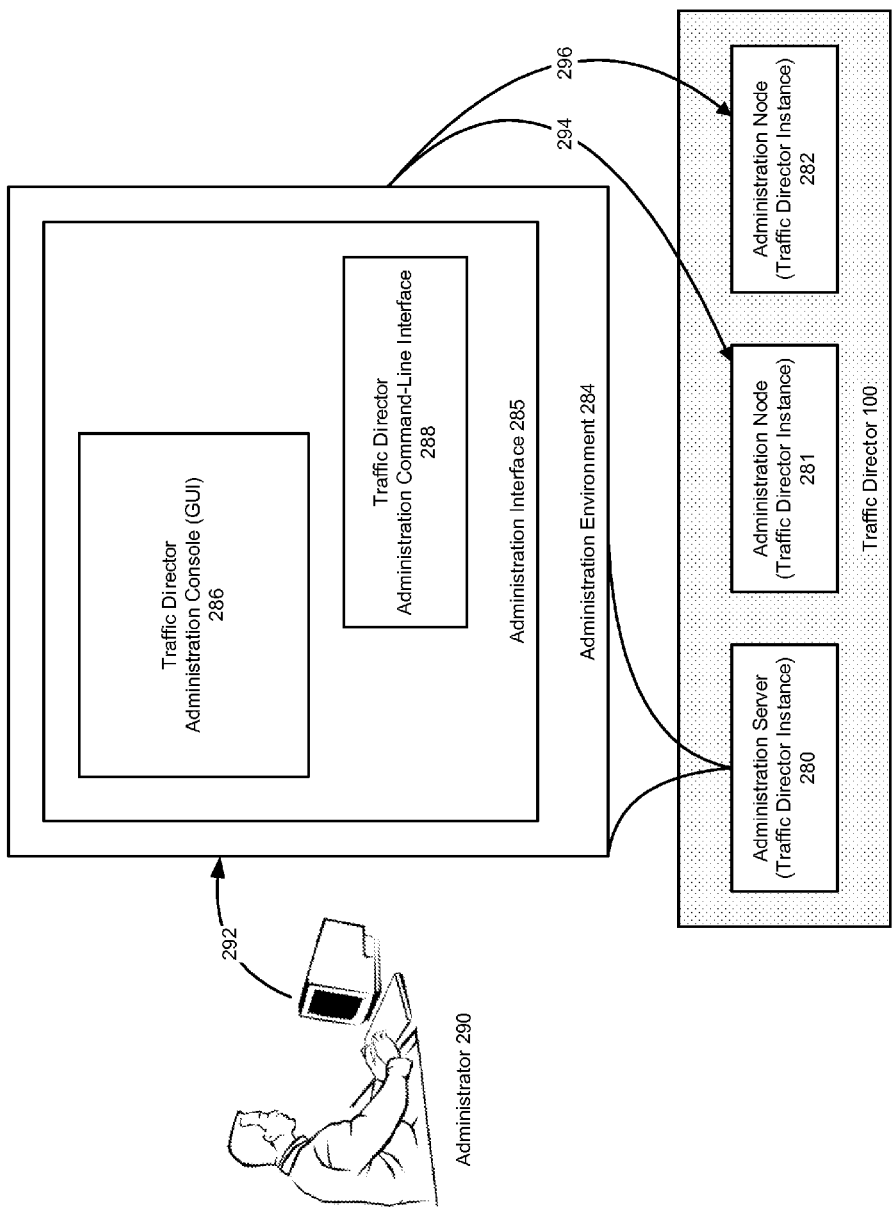
FIG. 4 illustrates a traffic director administration environment and interface, in accordance with an embodiment.

FIG. 4 illustrates a traffic director administration environment and interface, in accordance with an embodiment. From an administration perspective, the traffic director is designed to be easy to install, configure, and use; and can include a simple, wizard-driven graphical interface, as well as a robust command-line interface, for use by an administrator in managing traffic director instances. As shown in FIG. 4, in accordance with an embodiment, the traffic director can include one or more traffic director instances 280, 281, 282, wherein at least one of the instances is designated an administration server (280), while other instances are designated as administration nodes (281, 282).

In accordance with an embodiment, an administration environment 284 includes an administration interface 285, which in turn includes one or more of an administration console (GUI) 286 and/or a command line interface 288, that enables an administrator 290 to configure or otherwise administer 292 the traffic director, or its instances 294, 296.

Dynamic Discovery of Origin Servers

In accordance with an embodiment, the traffic director makes it easy for an administrator to add origin servers to server pools, by dynamically discovering origin servers and detecting their server type and/or other properties.

For example, in accordance with an embodiment, when the administrator enables dynamic discovery, the traffic director can dynamically discover supported/recognized application servers within a server pool. From the perspective of the traffic server, knowing whether it is acting as a proxy (i.e., proxying) to a generic application server type, or alternatively a recognized server type such as a WebLogic server, is useful in that it helps the traffic director to apply server type-specific routing, throttling, and other optimizations. Such optimizations can be automatically applied by the system, without a need for further manual configuration by the administrator.

From the perspective of a client making requests to back-end origin servers, although those requests are routed somewhat transparently by the traffic server to the origin servers, the traffic director's ability to discover origin server types, and apply server-specific optimizations, provides performance advantages whenever recognized server types are used.

In accordance with an embodiment, if the administrator wants to create an origin-server pool that represents a cluster of recognized managed server types, e.g., WebLogic servers, they do not need to specify each managed server in that cluster as an origin server. Instead, it is sufficient to specify any one of the managed servers as an origin server in the pool. The traffic director can then dynamically discover the presence of other WebLogic server instances in the cluster, and distribute client requests both to the managed server that is configured as an origin server, and also to the dynamically discovered managed servers in the same cluster.

Similarly, when dynamic discovery is enabled, if any of the managed servers in the cluster is stopped, added, or removed, the administrator need not update the definition of the origin-server pool.

In accordance with an embodiment which uses WebLogic server, each Weblogic server instance includes its own reverse proxy module or plug-in, which can proxy incoming HTTP traffic to the back end application server, and can provide Weblogic-specific response headers in response to a health-check request. For example, a x-weblogic-jvmid response header can indicate a JVMID of the current WebLogic server node; a x-weblogic-cluster-hash response header can provide a hash value of WebLogic cluster nodes and as such indicate whenever a cluster is modified; and a x-weblogic-cluster-list response header can return a lists of JVMIDs corresponding to those Weblogic servers in a cluster.

When dynamic discovery is enabled for an origin-server pool in a WebLogic environment, the traffic director can discover remaining WebLogic origin servers in the pool as follows:

First, when a traffic director instance starts, it checks whether the origin servers specified in the pool are WebLogic managed servers, and whether the servers belong to a cluster, by sending an HTTP health-check request to each configured origin server. For any particular origin-server pool, the HTTP request type that the traffic director sends for dynamic discovery can be the health-check request type that is currently configured for that pool. The origin server's response will indicate whether that server is a WebLogic managed server, using response headers similar to those described above. If the origin server is a WebLogic managed server that belongs to a cluster, then the response will also include a list of the managed servers in the cluster.

In accordance with an embodiment, when the traffic director receives a response with x-weblogic-cluster-hash and x-weblogic-cluster-list response headers, the traffic director will first use the hash value response header to determine whether the cluster has been modified, and if so will parse the remaining response header, e.g.,

```
x-weblogic-cluster-list;JVMID\!dns/hex-ip\!port\!https-
port|JVMID\!dns/hex-ip\!port\!https-port
``` to determine the JVMIDs, ports, and additional information for the newly added WebLogic servers in the cluster, and then add these to the server pools.

Next, the traffic director uses the information in the response from the origin server to update its configuration with regard to the discovered managed servers. In accordance with an embodiment, the dynamically discovered origin servers inherit all of the properties, e.g. weight, or maximum connections, that are specified for the configured origin server.

Subsequently, at each periodic health-check interval configured for the origin-server pool, the traffic director attempts to detect changes in the cluster, by sending dynamic-discovery health-check requests to those WebLogic server instances that are configured as origin servers in the pool. If the response indicates a change in the cluster since the previous health check, such as removal or addition of a managed server, then the traffic director will update the configuration with the new set of dynamically discovered origin servers.

Although the above description uses WebLogic as an illustration, in accordance with other embodiments, a similar technique can be used to discover other types of supported/recognized origin servers within a server pool. Dynamically discovered origin servers are not stored permanently in the origin-server pool definition of the instance's configuration. As such, when a traffic director instance is restarted, the process of dynamic discovery by that instance starts afresh.

In accordance with an embodiment, the dynamic discovery feature is not enabled by default. An administrator can enable dynamic discovery by using either the administration console, or the command-line interface (CLI). When an origin-server pool is modified this is, in effect, modifying a configuration, so for any updated origin-server pool settings to take effect, the corresponding configuration should be redeployed.

Figure 5:
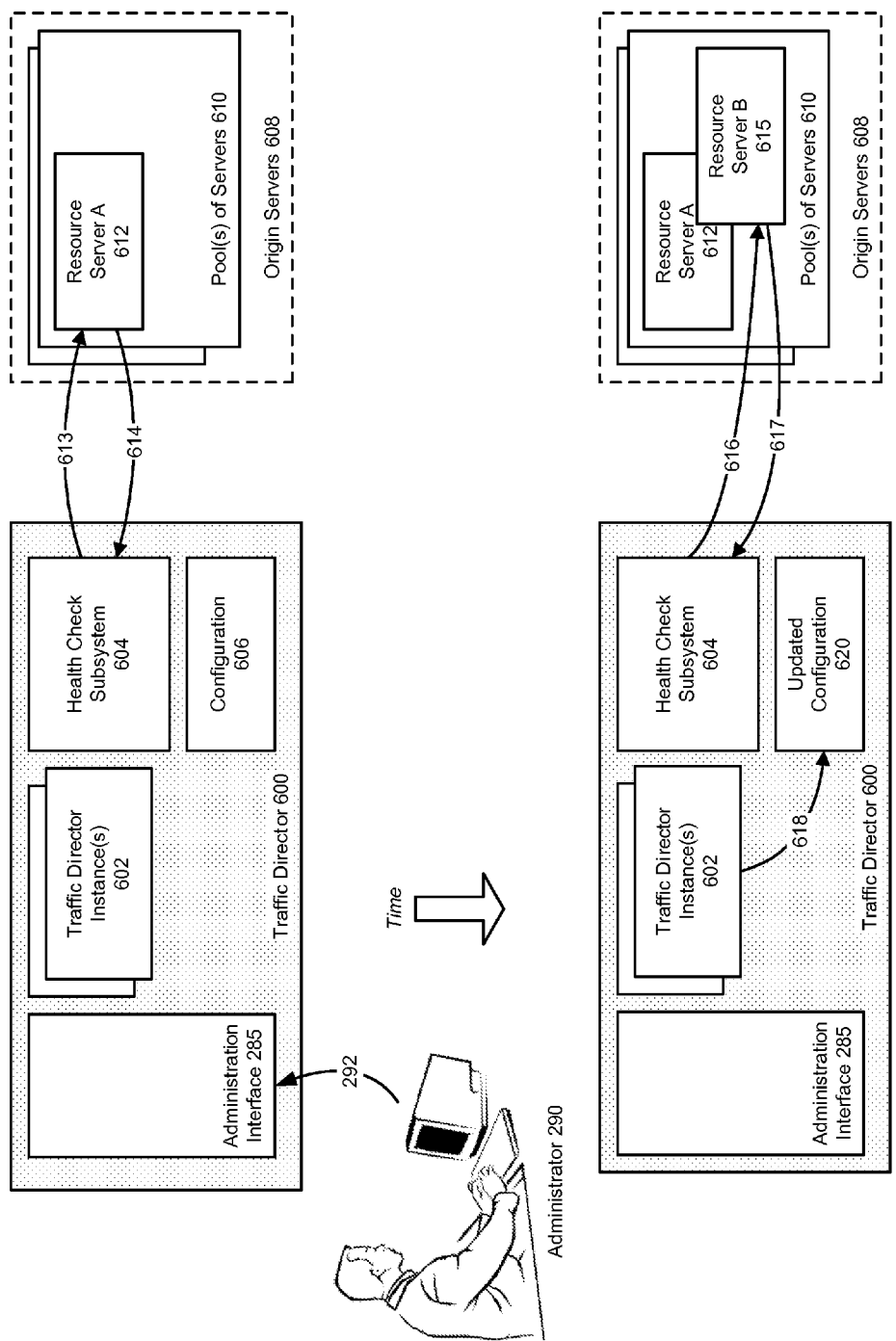
FIG. 5 illustrates dynamic discovery of origin servers in a traffic director, in accordance with an embodiment.

FIG. 5 illustrates dynamic discovery of origin servers in a traffic director, in accordance with an embodiment. As shown in FIG. 5, an administrator 290 can interact 292 with and administer a traffic director 600 using an administration interface 285, which in turn includes one or more of an administration console (GUI) and/or a command line interface. The traffic director can include one or more traffic director instances 602, and can communicate requests to origin servers 608 having one or more pools of servers 610. Each pool of servers can include one or more (existing) resource servers, such as resource server A 612.

In accordance with an embodiment, the traffic director includes a health check subsystem 604, and a configuration 606, wherein the configuration provides information about various elements of the traffic director instances, such as listeners, origin servers, failover groups, and logs.

The configuration can be initially modified by the administrator, to indicate that a particular origin-server pool includes a particular resource server. At each periodic health-check interval configured for that origin-server pool, the health check subsystem then checks the health of each of its configured resource servers, for example by sending an HTTP health-check request 613, and receiving an appropriate response 614 from resource server A.

In accordance with an embodiment, when dynamic discovery is enabled, at each periodic health-check interval configured for the origin-server pool, the traffic director also attempts to detect changes in the pool, such as resource server B 615, by sending dynamic-discovery health-check requests 616 to any new server instances configured as origin servers within the pool, and receiving appropriate responses 617. Dynamically discovered servers are applied only with the server pool through which the node was discovered. The traffic director will then update 618 its configuration with this new set of dynamically discovered origin servers 620.

In accordance with an embodiment which uses WebLogic server instances, when dynamic discovery is enabled for an origin-server pool, the health check subsystem checks whether the origin servers specified in the pool are WebLogic managed servers, and whether the servers belong to a cluster. As described above, the origin server's response header can indicate whether that server is a WebLogic server managed server, and, if the origin server is a WebLogic managed server that belongs to a cluster, then the response will also include a list of the managed servers in the cluster.

Figure 6:
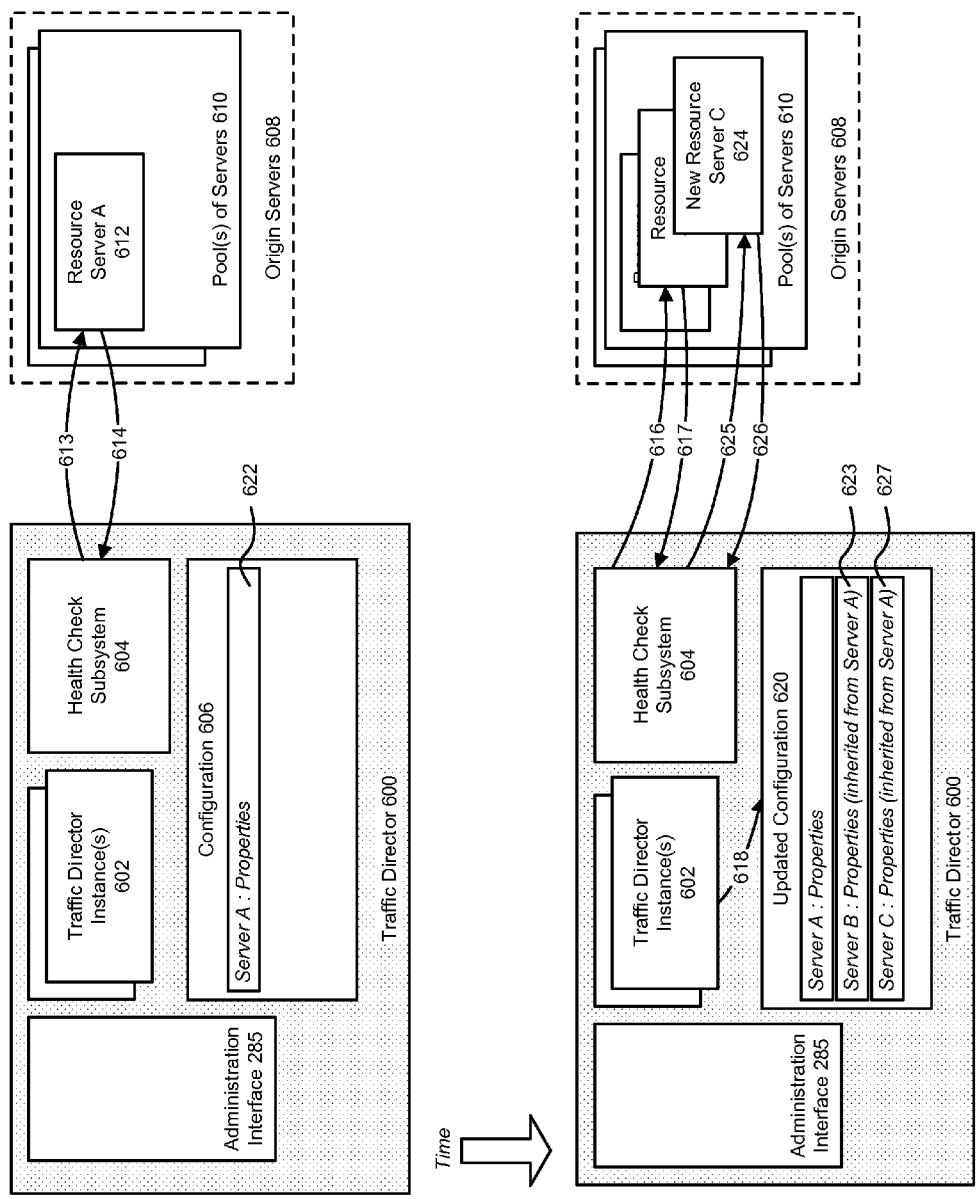
FIG. 6 further illustrates dynamic discovery of origin servers in a traffic director, in accordance with an embodiment.

FIG. 6 further illustrates dynamic discovery of origin servers in a traffic director, in accordance with an embodiment. As described previously, when dynamic discovery is enabled, at each periodic health-check interval configured for an origin-server pool, the traffic director checks the health of each of its configured resource servers, and also attempts to detect changes in the pool by sending dynamic-discovery health-check requests to any new server instances, and updating its configuration with the new set of dynamically discovered origin servers.

As further shown in FIG. 6, the configuration can include properties for each configured origin server in the pool, including in this example resource server A properties 622. In accordance with an embodiment, the dynamically discovered origin servers inherit all of the properties, e.g. weight, or maximum connections, that are specified for the configured origin server. For example, the traffic director can configure dynamically discovered resource server B as an origin server such that its properties 623 inherit (are the same as) those of configured resource server A.

Subsequently, if the traffic director detects further changes in the pool, such as new resource server C 624, through subsequent health checks 625, 626, the traffic director can similarly configure resource server C as an origin server such that its properties 627 also inherit (are the same as) those of configured resource server A.

In accordance with an embodiment, examples of the types of server properties that can be associated with a configured or discovered resource server include:

Weights: an origin server can be configured with different load weights—depending on the weights configured the traffic director will direct incoming request load to this server.
Rampup time: an origin server can be configured with a rampup time so that incoming request load is not instantly directed to the origin server.
Max connections: an origin server can be configured to support a maximum number of concurrent connections.
Backup: an origin server within a pool can be configured as a backup, in which case the traffic director will not route requests to that server unless all other servers in the pool which are not indicated as backups are marked offline, In accordance with an embodiment which uses WebLogic, if the origin server's response indicates that the server is a WebLogic managed server and belongs to a cluster, then the response will also include a list of the managed servers in the cluster. The traffic director uses the information in the response from the origin server to update its configuration with the discovered managed servers. For example, if a particular origin server pool has a configuration:

Listing 1

```
<server>
    <origin-sever-pool>
        <name>wls-cluster</name>
        <type>http</type>
            <origin-server>
                <host>nsapi.us.oracle.com</host>
                <port>7011</port>
            </origin-server>
    </origin-sever-pool>
</server>
``` then, if the traffic director discovers a Weblogic server node running at 'nsapi.us.oracle.com:7012' it will configure that origin server with the same (i.e., inherited) properties as that of 'nsapi.us.oracle.com:7011'.

Figure 7:
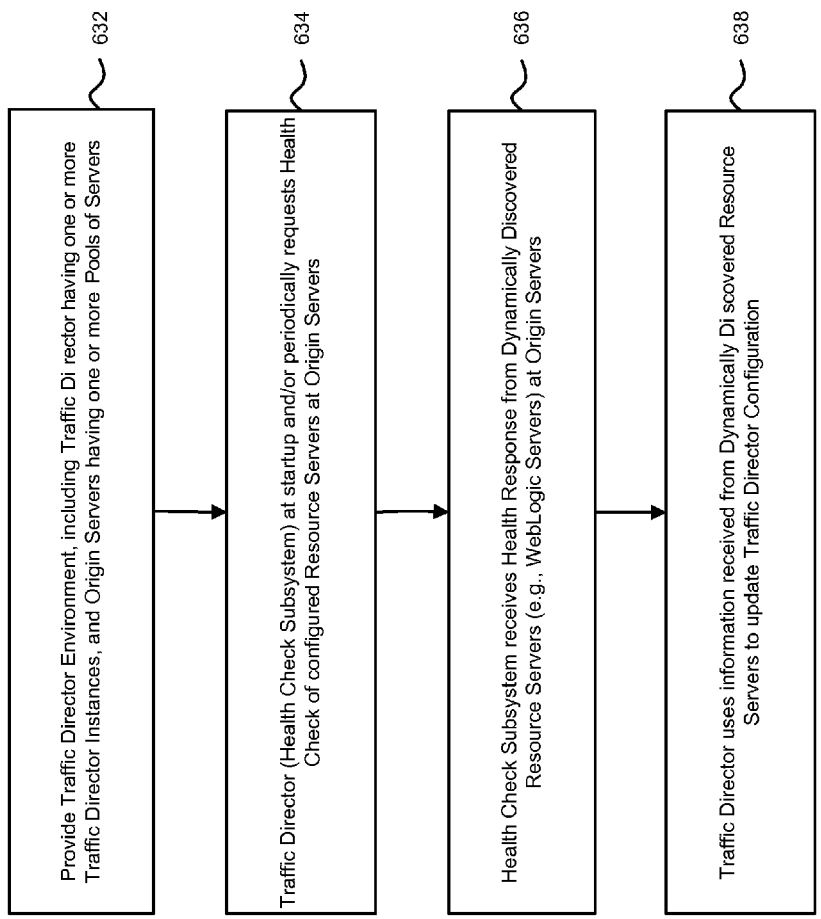
FIG. 7 is a flowchart of a method for providing dynamic discovery of origin servers in a traffic director, in accordance with an embodiment.

FIG. 7 is a flowchart of a method for providing dynamic discovery of origin servers in a traffic director, in accordance with an embodiment. As shown in FIG. 7, at step 632, a traffic director environment is provided, including a traffic director having one or more traffic director instances, and origin servers having one or more pools of servers. At step 643, the traffic director (in accordance with an embodiment, a health check subsystem thereof) at startup and/or periodically requests a health check of those resource servers within the origin servers that have been previously configured by the administrator. At step 636, the traffic director's health check subsystem receives health responses from one or more dynamically discovered resource servers (e.g., WebLogic servers) at the origin servers. At step 638, the traffic director uses the information received from the dynamically discovered resource servers to update the traffic director configuration, including inheriting properties from previously configured origin servers where appropriate.

Figure 8:
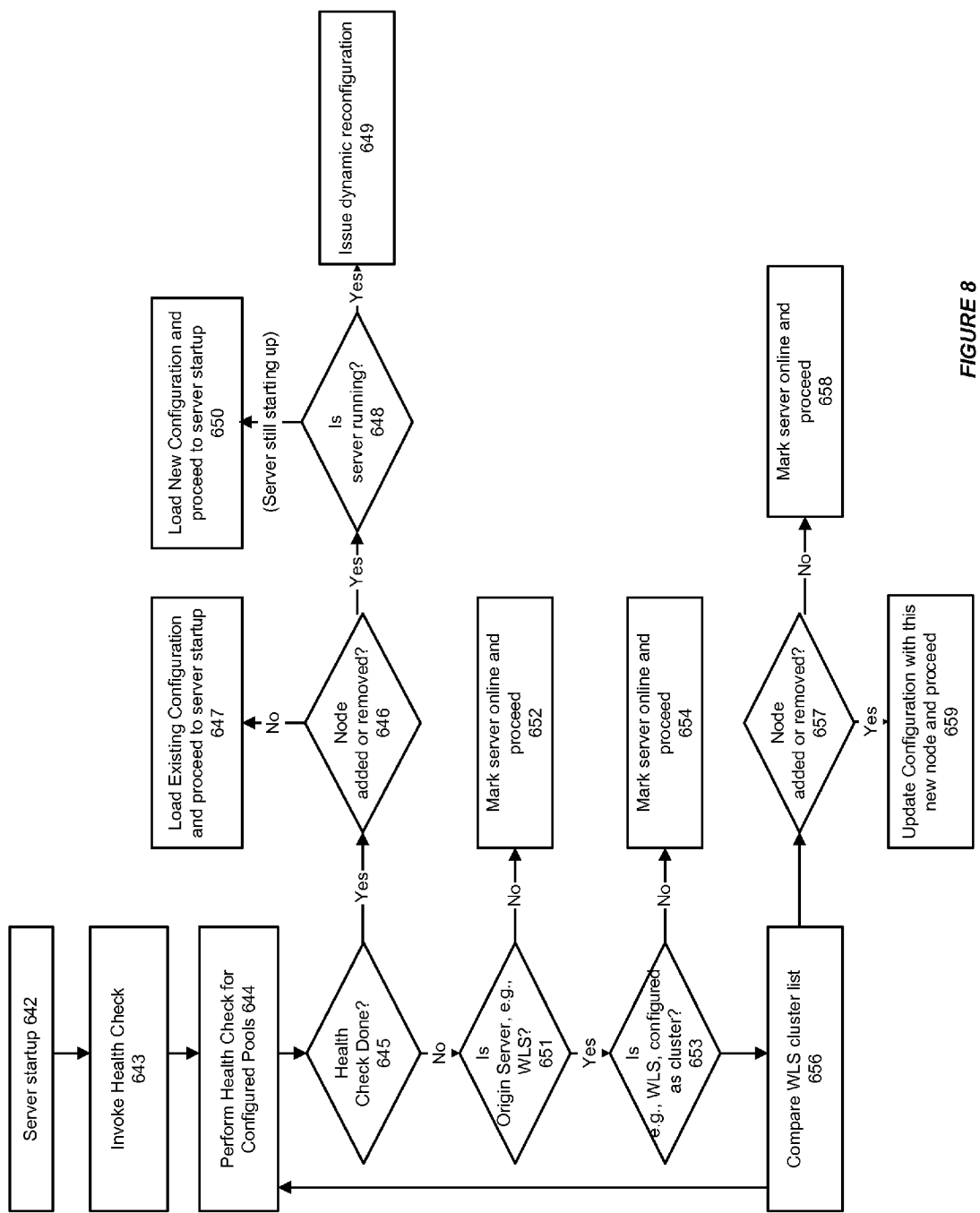
FIG. 8 is a flowchart of another method for providing dynamic discovery of origin servers in a traffic director, in accordance with an embodiment.

FIG. 8 is a flowchart of another method for providing dynamic discovery of origin servers in a traffic director, in accordance with an embodiment. In particular, FIG. 8 illustrates an embodiment which uses WebLogic server such that, when dynamic discovery is enabled for an origin-server pool, the traffic director can discover new or additional WebLogic origin servers in the pool.

As shown in FIG. 8, at step 642, the traffic server starts and invokes the health check subsystem (step 643) to perform a health check on configured pools (step 644).

At step 645, if the health check has completed, the system can proceed to either load an existing configuration (steps 646, 647), load a new configuration (steps 648, 650), or perform dynamic reconfiguration (step 649).

At step 651, if the origin server is a WebLogic server, and is configured as a cluster (step 653), the process compares the cluster list (step 656), and updates the configuration with new nodes where appropriate (steps 657, 659). Otherwise, the servers can be marked online and the process can proceed (steps 652, 654, 658).

In accordance with an embodiment, to dynamic discovery routing for use with the traffic director, an element called "dynamic-server-discovery" can be specified for that server, examples of which are provided in Table 1.

TABLE 1

| Element | Occurrences | Description | Value |
|---|---|---|---|
| Dynamic-server discovery | 0 or 1 | Enable dynamic server discover for, e.g. Weblogic cluster nodes | True or False. By default, True. |

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Although some of the described embodiments describe features in the context of an Oracle Traffic Director environment, the described features can also be used in the context of other computing environments. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A traffic director which receives and communicates requests from clients to a plurality of pools of origin servers each comprising a plurality of origin servers, the traffic director comprising:
  a microprocessor and a computer memory;
  a dynamic configuration module wherein the dynamic configuration module stores information about the plurality of pools of origin servers and the pluralities of origin servers of said plurality of pools of origin servers;
  an HTTP connection handler which receives HTTP requests from said clients;
  an HTTP engine operating on said microprocessor and computer memory, wherein said HTTP engine receives said HTTP requests from said HTTP connection handler;
  a reverse proxy module in said HTTP engine, wherein the reverse proxy module selects a pool of said plurality of pools of origin servers to which said requests should be directed and forwards said requests one or more of the plurality of origin servers in said pool; and
  a health check subsystem within the reverse proxy module wherein the health check subsystem is configured to
    periodically send HTTP health check requests to each of said pluralities of origin servers of said plurality of pools of origin servers;
    receive HTTP health check responses from each of said pluralities of origin servers of said plurality of pools of origin servers;
    analyze said HTTP health check responses to determine whether any new server instance has been configured as an origin server within the plurality of pools of origin servers, and
    automatically update the dynamic configuration module, if a new server instance has been configured as indicated by said HTTP health check responses, to include the new server instance.

2. The traffic director of claim 1, wherein the health check subsystem is configured to analyze said HTTP health check responses by:
  analyzing a hash value in a health check response to determine whether a pool of origin servers has been modified.

3. The traffic director of claim 1, wherein the health check subsystem is configured to analyze said HTTP health check responses by:
  analyzing a hash value in a health check response to determine whether a pool of origin servers has been modified, and,
  if the pool of origin servers has been modified, parsing the health check response to identify any new server instance in said pool.

4. The traffic director of claim 1, wherein the health check subsystem is configured such that automatically updating the dynamic configuration to include the new server instances comprises inheriting properties for the new server instance from an origin server in the same pool of origin servers as the new server instance.

5. The traffic director of claim 1, wherein the health check subsystem is configured such that automatically updating the dynamic configuration to include the new server instances comprises assigning a load weight property to the new server instance wherein the load weight property is used by the traffic director to control incoming request load to the new server instance.

6. The traffic director of claim 1, wherein the health check subsystem is configured such that automatically updating the dynamic configuration to include any new server instances comprises assigning a rampup property to the new server instance wherein the rampup property is used by the traffic director to delay application of incoming request load to the new server instance.

7. The traffic director of claim 1, wherein the health check subsystem is configured such that automatically updating the dynamic configuration to include any new server instances comprises assigning a backup property to the new server instance wherein the backup property indicates that the traffic director will not route requests to the new server instance unless all other origin servers which are not indicated as backups in the pool of origin servers containing the new server instances are marked as offline.

8. The traffic director of claim 1, wherein one or more of the plurality of origin servers are WebLogic servers, and wherein each Weblogic server can provide Weblogic-specific response headers in response to a health-check request.

9. The traffic director of claim 1, further comprising an administration interface configured to allow an administrative user to modify the dynamic configuration module.

10. The traffic director of claim 1, further comprising an administration interface configured to allow an administrative user to enable and disable dynamic discovery of new server instances in the plurality of pools of origin servers.

11. A method for implementing a traffic director which receives and communicates requests from clients to a plurality of pools of origin servers each comprising a plurality of origin servers, the method comprising:
proving a dynamic configuration module wherein the dynamic configuration module stores information about the plurality of pools of origin servers and the pluralities of origin servers of said plurality of pools of origin servers;
providing an HTTP connection handler which receives HTTP requests from said clients;
providing an HTTP engine which receives said HTTP requests from said HTTP connection handler;
providing a reverse proxy module in said HTTP engine, wherein the reverse proxy module selects a pool of said plurality of pools of origin servers to which said requests should be directed and forwards said requests one or more of the plurality of origin servers in said pool;
providing a health check subsystem in said traffic director;
periodically sending HTTP health check requests from said health check subsystem to each of said pluralities of origin servers of said plurality of pools of origin servers;
receiving HTTP health check responses at the health check subsystem from each of said pluralities of origin servers of said plurality of pools of origin servers;
analyzing said HTTP health check responses to determine whether any new server instance has been configured as an origin server within the plurality of pools of origin servers, and
automatically updating the dynamic configuration module, if a new server instance has been configured as an origin server as indicated by said HTTP health check responses, to include the new server instance.

12. The method of claim 11, wherein analyzing said HTTP health check responses comprises analyzing a hash value in a health check response to determine whether a pool of origin servers has been modified.

13. The method of claim 11, wherein analyzing said HTTP health check responses comprises:
analyzing a hash value in a health check response to determine whether a pool of origin servers has been modified, and,
if the pool of origin servers has been modified, parsing the health check response to identify any new server instance in said pool.

14. The method of claim 11, wherein the automatically updating the dynamic configuration to include the new server instances comprises:
inheriting properties for the new server instance from an origin server in the same pool of origin servers as the new server instance.

15. The method of claim 11, wherein the automatically updating the dynamic configuration to include the new server instances comprises:
assigning a load weight property to the new server instance wherein the load weight property is used by the traffic director to control incoming request load to the new server instance.

16. The method of claim 11, wherein the automatically updating the dynamic configuration to include the new server instances comprises:
assigning a rampup property to the new server instance wherein the rampup property is used by the traffic director to delay application of incoming request load to the new server instance.

17. The method of claim 11, wherein the automatically updating the dynamic configuration to include the new server instances comprises:
assigning a backup property to the new server instance wherein the backup property indicates that the traffic director will not route requests to the new server instance unless all other origin servers which are not indicated as backups in the pool of origin servers containing the new server instances are marked as offline.

18. The method of claim 11, wherein one or more of the plurality of origin servers are WebLogic servers, and wherein each Weblogic server provides Weblogic-specific response headers in response to a health-check request.

19. The method of claim 11, further comprising:
providing an administration interface to said traffic director; and
allowing an administrative user of the administrative interface to enable and disable dynamic discovery of new server instances in the plurality of pools of origin servers.

20. A non-transitory computer readable medium, including instructions stored thereon for implementing a traffic director which receives and communicates requests from clients to a plurality of pools of origin servers each comprising a plurality of origin servers, which instructions, when read and executed by one or more computers cause the one or more computers to perform steps comprising:
providing a dynamic configuration module wherein the dynamic configuration module stores information about the plurality of pools of origin servers and the pluralities of origin servers of said plurality of pools of origin servers;
providing an HTTP connection handler which receives HTTP requests from said clients;
providing an HTTP engine which receives said HTTP requests from said HTTP connection handler;
providing a reverse proxy module in said HTTP engine, wherein the reverse proxy module selects a pool of said plurality of pools of origin servers to which said requests should be directed and forwards said requests one or more of the plurality of origin servers in said pool;
providing a health check subsystem in said traffic director;
periodically sending HTTP health check requests from said health check subsystem to each of said pluralities of origin servers of said plurality of pools of origin servers;
receiving HTTP health check responses at the health check subsystem from each of said pluralities of origin servers of said plurality of pools of origin servers;
analyzing said HTTP health check responses to determine whether any new server instance has been configured as an origin server within the plurality of pools of origin servers, and
automatically updating the dynamic configuration module, if a new server instance has been configured as an origin server as indicated by said HTTP health check responses, to include the new server instance.

* * * * *

UNITED STATES PATENT AND TRADEMARK OFFICE
CERTIFICATE OF CORRECTION

PATENT NO. : 8,914,502 B2  
APPLICATION NO. : 13/601530  
DATED : December 16, 2014  
INVENTOR(S) : Srinivasan et al.

Page 1 of 1

It is certified that error appears in the above-identified patent and that said Letters Patent is hereby corrected as shown below:

On Title page 2, column 2, item 56 under Other Publications, line 1, delete "Communiations" and insert -- Communications --, therefor.

In the Drawings

On sheet 3 of 8, in figure 3, under Reference Numeral 224, line 8, delete "Instrusion" and insert -- Intrusion --, therefor.

On sheet 7 of 8, in figure 7, under Reference Numeral 632, line 1, delete "Di rector" and insert -- Director --, therefor.

On sheet 7 of 8, in figure 7, under Reference Numeral 638, line 1, delete "Di scovered" and insert -- Discovered --, therefor.

In the Specification

In column 5, line 55, delete "C1 86." and insert -- C 186. --, therefor.

In column 9, line 61, delete "offline," and insert -- offline. --, therefor.

Signed and Sealed this  
Fourth Day of August, 2015

Michelle K. Lee  
*Director of the United States Patent and Trademark Office*